D. GUPTAIL.
Cultivator.
No. 69,801.
Patented Oct. 15, 1867.
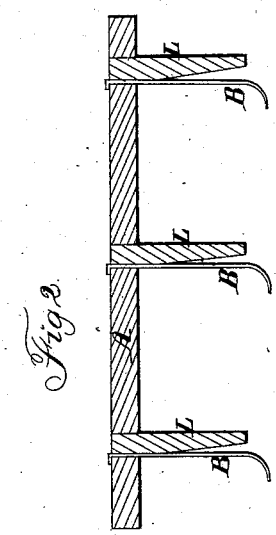
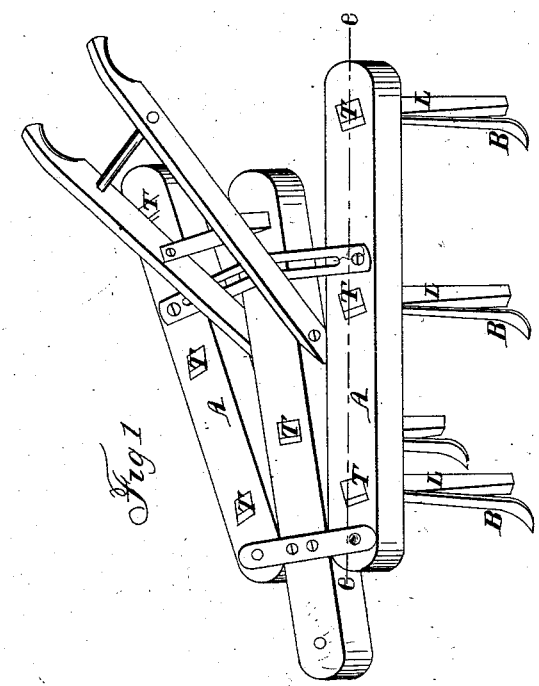
Witnesses.
N. H. Sherburner
B. Burritt
Inventor
Dan Guptail

United States Patent Office.

DAN GUPTAIL, OF ELGIN, ILLINOIS, ASSIGNOR TO HIMSELF AND H. N. MOSELEY, OF THE SAME PLACE.

Letters Patent No. 69,801, dated October 15, 1867.

IMPROVEMENT IN CULTIVATORS.

*The Schedule referred to in these Letters Patent and making part of the same.*

TO ALL WHOM IT MAY CONCERN:

Be it known that I, DAN GUPTAIL, of Elgin, in the county of Kane, and State of Illinois, have invented certain new and useful Improvements in Cultivators; and I do hereby declare the following to be a full and exact description of the construction and operation of the same, reference being had to the accompanying drawings, and to the letters of reference marked thereon, making a part of this specification, in which—

Figure 1 is a perspective view.

Figure 2 is a vertical longitudinal section on the line $e\ e$, showing the form of the shovels and the manner of attaching the same.

Similar letters of reference, as they occur in the separate figures, denote like parts in each of the drawings.

The nature of my invention relates to an improvement in the shovels, and consists in constructing the same in the form of a spring, in combination with a wedge or key driven through a mortise in the frame, the front edge of said key being bevelled backward to allow the shovel the proper elasticity, whereby the earth is more readily loosened, as will be hereinafter more fully explained.

To enable others skilled in the art to construct and use my invention, I will proceed to describe the same with reference to the drawings.

A A″ represents the frame of the cultivator, which may be as shown in the drawings, or may be of any suitable form of construction. B represents the shovels, of which there may be any suitable number in each piece of the frame, said shovels being made of spring steel. The width of the same is from one and one-half inch to two inches, and from twelve to fourteen inches in length. The lower end of the same is curved or bent forward to form the shear or cutting part of the shovels. T represents a mortise cut through the sides or bed-pieces of the frame vertically, through which the upper ends of the shovels pass, and are held therein by means of a wedge or key, L, driven downward through said mortise in the sides or bed-pieces of the frame; the upper end of said shovels being bent forward to form a hook or clasp, which comes in contact with or against the upper side of the frame, thereby preventing the same from drawing through said mortises therein, said wedge or key L being bevelled or cut away at the side next to the shovels, as shown in the drawings, fig. 2, to allow the shovels the proper elasticity. With this style of shovels the cultivator can be more conveniently managed, and its work more effective than any of the hereinbefore-known arrangements wherein the shovels are not elastic.

Having thus described the nature and object of my invention, what I claim as new, and desire to secure by Letters Patent, is—

The elastic or spring-shovel B, in combination with wedge or key L, substantially as and for the purpose set forth.

DAN GUPTAIL.

Witnesses:
M. H. SHERBURNE,
B. BURRITT.